US006212493B1

(12) United States Patent
Huggins et al.

(10) Patent No.: US 6,212,493 B1
(45) Date of Patent: Apr. 3, 2001

(54) PROFILE DIRECTED SIMULATION USED TO TARGET TIME-CRITICAL CROSSPRODUCTS DURING RANDOM VECTOR TESTING

(75) Inventors: James D. Huggins, Westborough; David H. Asher, Sutton; James B. Keller, Waltham, all of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/203,119

(22) Filed: Dec. 1, 1998

(51) Int. Cl.[7] .................................................. G06F 11/263
(52) U.S. Cl. ................................ 703/22; 703/17; 714/33; 714/739
(58) Field of Search ................................. 703/14, 15, 16, 703/17, 22; 714/32, 33, 739, 728

(56) References Cited

U.S. PATENT DOCUMENTS

| | | | |
|---|---|---|---|
| 5,488,573 | 1/1996 | Brown et al. | 703/21 |
| 5,572,666 | * 11/1996 | Whitman | 714/32 |
| 5,592,674 | * 1/1997 | Gluska et al. | 710/269 |
| 5,646,949 | * 7/1997 | Bruce, Jr. et al. | 714/739 |
| 5,740,183 | 4/1998 | Lowe | 714/736 |
| 5,784,550 | * 7/1998 | Brockmann et al. | 714/33 |
| 5,845,064 | * 12/1998 | Huggins | 714/33 |
| 5,859,962 | * 1/1999 | Tipon et al. | 714/33 |
| 5,928,334 | * 7/1999 | Mandyam et al. | 709/248 |

OTHER PUBLICATIONS

Gwennap, L., "Digital 21264 Sets New Standard," *Microprocessor Report*, http://www.digital.com/semiconductor/alpha/papers/microrep/digital12.htm, downloaded Nov. 23, 1998.

Keller, J., "A Superscalar Alpha Processor with Out–of–Order Execution," *Digital Semiconductor*, presented at the Microprocessor Forum on Oct. 22–23, 1996; http://www.digital.com/info/semiconductor/a264up1/index.html, downloaded Nov. 23, 1998.

Miyake, Jiro et al., "Automatic Test Generation for Functional Verification of Microprocessors," Proc. of 3rd Asian Test Symp., Nov. 1994, pp. 292–297.*

Iwashita, Hiroaki et al., "Automatic Program Generator for Simulation–Based Processor Verification," Proc. 3rd Asian Test Symp., Nov. 1994, pp. 298–303.*

Yen, Jen–Tien et al., "Overview of Power PC(TM) 620 Multiprocessor Verification Strategy," Int'l Test Conf., Oct. 1995, pp. 167–174.*

Chandra, A. et al., "AVPGEN—A Test Generator for Architecture Verification," IEEE Trans. on VLSI Systems, vol. 3, No. 2, Jun. 1995, pp. 188–200.*

Wood, David et al., "Verifying a Multiprocessor Cache Controller Using Random Test Generation," IEEE Design & Test of Computers, vol. 7, No. 4, Aug. 1990, pp. 13–25.*

* cited by examiner

Primary Examiner—Kevin J. Teska
Assistant Examiner—Kyle J. Choi
(74) Attorney, Agent, or Firm—Hamilton, Brook, Smith & Reynolds, P.C.

(57) ABSTRACT

A technique for verification of a complex integrated circuit design, such as a microprocessor, using a randomly generated test program to simulate internal events and to determine the timing of external events. The simulation proceeds in two passes. During a first pass, the randomly generated test program and data vectors are applied to a simulation model of the design being verified. During this first pass, an internal agent collects profile data about internal events such as addresses and program counter contents as they occur. During a second pass of the process, the profile data is used to generate directed external events based upon the data observed during the first pass. In this manner, the advantages of rapid test vector generation provided through random schemes is achieved at the same time that a more directed external event correlation is accomplished.

21 Claims, 3 Drawing Sheets

```
PC:  0x0000000000042000
PC:  0x0000000000042004
PC:  0x0000000000042008  } 302
PC:  0x0000000000042010
PC:  0x0000000000042014
PC:  0x000000000004201c
PC:  0x0000000000042020
PC:  0x0000000000042024  ←⤶ 310
PC:  0x0000000000042028
PC:  0x000000000004202c
PC:  0x0000000000042030
0x0000000390062000 LDx  } 308
PC:  0x0000000000042034
PC:  0x0000000000042038
0x0000000390062000 STx
PC:  0x000000000004203c
0x0000000390042000 STx  } 304
0x0000000390042008 STx
0x00000000f5fb8e18 LDx
0x00000802064e0e18 LDx
0x00000802064e0e18 LDx
0x00000802064e0e18 LDx
0x0000080000000000 STx
0x0000080000000008 STx
PC:  0x0000000000042040  } 306
PC:  0x0000000000042044
PC:  0X0000000000042048
0x0000000033300010 LDx
0x0000000033300018 LDx
0x0000000033300020 LDx
0x0000000033300028 LDx
PC:  0x000000000004204c
PC:  0x0000000000042050
PC:  0x0000000000042054
0x0001f5f000000000 STx
0x0001f5f000000008 STx
PC:  0x0000000000042058
PC:  0x000000000004205c
0x0000000f018300f0 LDx
PC:  0x0000000000042060
0x0000000f018300f0 STx
0x0000000f018300f0 STx
PC:  0x0000000000042064
PC:  0x0000000000042068
0x00000802064e0d28 LDx  } 309
PC:  0x000000000004206c
PC:  0x0000000000042070
```

FIG. 3

PROFILE DIRECTED SIMULATION USED TO TARGET TIME-CRITICAL CROSSPRODUCTS DURING RANDOM VECTOR TESTING

FIELD OF THE INVENTION

The present invention relates to the design of microprocessors and similarly complicated integrated circuit devices and in particular to the development of functional test programs.

BACKGROUND OF THE INVENTION

Because of the rapid growth in the complexity of microprocessors, various methods have been developed for expediting the verification of a design prior to its actual implementation in hardware. Most of these methods relate to functional testing which uses information concerning desired behaviors specified by the designer of the microprocessor during a design phase. For example, these methods typically evolve around functional tests which use the instruction set of the microprocessor. Such functional testing has been generally proven to be reliable and robust.

In the typical scenario, a hardware design language is used to develop a register and logic gate level description of the processor in software. The functional test programs can then be written in any convenient computer language such as C++. The functional test is then run on the hardware description language model of the processor. The relative effectiveness of functional test programs depends upon how quickly the functional test can be completed, how well the functional model can be examined for errors, and the time required to generate the test software.

In general, two different techniques have evolved for developing functional test programs, including random generation and manual generation. The oldest method for developing functional test programs is write them manually. Typically, the functional test is implemented as a specialized program written by one of the hardware designers. While these types of programs are typically more expensive to develop and consume much programming time, they are often more effective than randomly developed sequences, since they can be written to target a particular feature of the microprocessor.

The known methods for manually generating test programs have a number of problems. For example, functional models that are tested using manually written programs may contain errors that the designers of the programs did not contemplate. The time that it takes to write a functional level test by hand versus the limited number of tests and limited variety of test sequences also makes manual testing a long and involved process.

Methods that use random instruction generators are considered to be inexpensive and efficient in many applications, and experience has been that they optimize the cost and speed at which errors can be found. With this technique, instruction sequences are produced by generating random binary patterns and then automatically translating them into an instruction sequence.

Unfortunately, randomly generated tests are not necessarily well adapted for determining whether a design will correctly execute all types of instruction sequences. For example, certain functions which are desirable to test may involve a particular sequence of internal instructions and external events. However, such external events are ordinally not synchronized with clock signals that determine the internal events.

Consider, for example, an external probe command of the type which is provided by another processor which is external to the microprocessor being tested but which contains a request for access to shared resource such as memory locations. Such probe commands usually have an address associated with them whereby the external processor is attempting to gain access to a shared memory location which is already being cached by the processor.

It is quite possible for an error in the hardware design for implementing a probe command to cause the microprocessor to produce an incorrect result when certain sequences of these activities occur. For example, the state of the cache memory of the processor under test and other registers may be critical as to whether the probe command is correctly handled. In order to devise an effective test for such an activity, access to the internal state of the processor is therefore typically required.

The problem with using randomly generated test programs is that they are not as effective in testing for known combinations of internal and external events. Ideally, in order to test microprocessor logic, the data or address associated with the test probe command relates in some way to data or an address which is already in use by the microprocessor or otherwise derived in some way from its present state.

Synchronization problems also develop with such an approach, since it takes a while typically for a probe command to reach over the system bus and arrive at the processor under test.

SUMMARY OF THE INVENTION

If one could predict which addresses or data would be in use at the time that a processor determines that it will accept a probe command, such functional tests would be more effective.

It would also be desirable for a functional test to verify external probe commands, interrupts, and similar instructions using random instruction generation techniques in a way that they are more effective.

A more effective randomized testing scheme could be implemented by anticipating internal events and initiating external events, thereby directly causing desirable interactions to occur.

More particularly, random stimulus could be used to create internal events within the microprocessor design simulation, while also applying external events which in turn interact with the internal events. These interactions would produce meaningful test cases when they result in conflicts with one another.

Unlike previous verification methods that typically generate external events randomly, both the type of event and its time of occurrence could be decided depending upon the current internal state, to increase the likelihood of generating conflicting external interactions.

The present invention is therefore a method and/or apparatus for generating functional test programs which include randomly generated instruction sequences. Initial profile information is recorded from a running randomly generated test instruction sequence which includes information such as instruction types, addresses and other statistics. In a second pass, the profile information is used to change the random test program in some way or to change the behavior of external events, so that contentions between events of interest are more likely to occur.

More particularly, a software simulation of the processor is first developed such as in a hardware description language. Next, a functional test program is developed, preferably by generating a random binary pattern and then translating it into an instruction sequence. In a first pass, the instruction sequence is then run on the hardware simulator. During this first pass, statistics relating to the state of the processor during the running of the random program are collected. For example, information concerning the memory addresses accesses by the program, the states of the program counter, instruction types, and other information is collected in a profile data file.

In a second pass, information from the stored profile from the first run of the program is used to generate directed simulation events. For example, a probe command using one of the addresses from the profile data file may be sent to the processor as a directed simulation event.

Another aspect of the invention takes into account the fact that many modern microprocessors use cache memories and out of order instruction execution. In other words, instructions may sometimes be speculatively issued from an instruction queue prior to actually completing the instruction. Furthermore, cache memories operating in accordance with a pyramidal hierarchal structure may contain multiple copies of the same data.

To provide some type of synchronization of the running random program with the external events, rather than simply recording an instruction cycle number or other time index in the profile data file, program counter information is also stored with the profile data. Using this information, a test address is then generated within the current program content, such as within a window of ten locations before and after a current program counter value. The selected test address is then used as an argument to the directed external event.

Information concerning the type of instruction can also be used to determine the type of directed external event that may be generated.

Preferably, any privileged instructions are removed from the profile in the second pass since that type of instruction may result in a program counter flow which is not necessarily the same each time that the random program is run.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is an exemplary profile data structure.

DETAILED DESCRIPTION OF THE INVENTION

Figure 1:
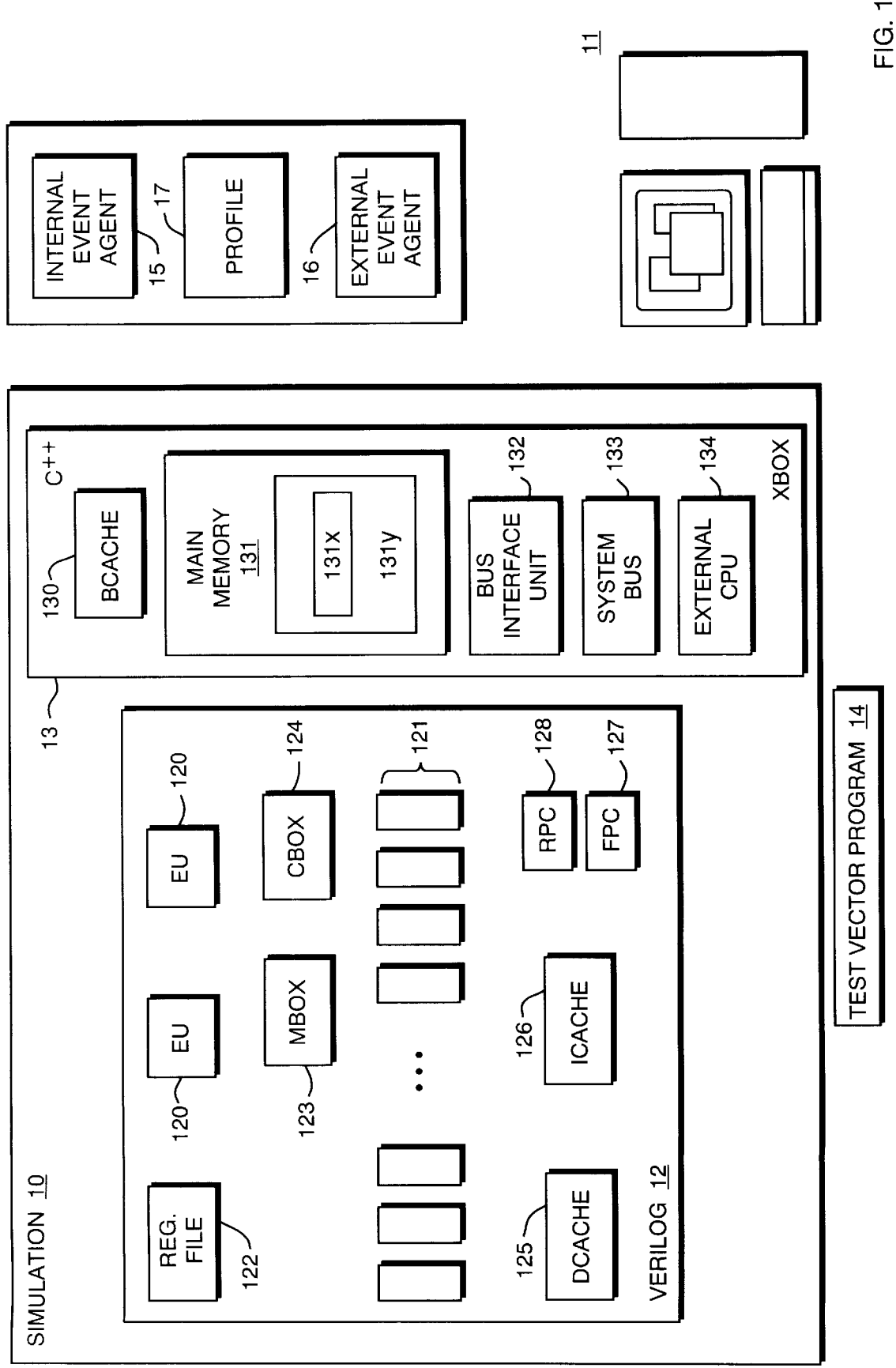
FIG. 1 is a block diagram showing the elements of a design verification system according to the invention.

Referring now more particularly to the drawings, FIG. 1 illustrates a system 10 for design verification according to the invention. The design verification system 10 consists of a number of software elements or components running on an appropriate computer system such as a work station 11. The software components of the system 10 consist of a processor simulation 12, an external hardware simulation (or XBOX) 13, a test program 14, an internal event agent 15, an external event agent 16, and a profile data structure 17.

The processor simulation 12 is a software model of a microprocessor or other highly complex integrated circuit for which the design is being verified. The various hardware elements of the processor are represented in the simulation 12, typically at a register and logic gate level. The simulation 12 may be provided in an appropriate hardware description language such as Verilog or similar language. (Verilog is a trademark of Cadence Design Systems of San Jose, Calif. for its computer aided design software.)

There is typically a simulation 12 routine associated with each of the component parts of the processor. For example, in the case of a simulation of the Alpha series microprocessor available from Digital Equipment Corporation of Maynard, Mass., the simulation 12 consists of individual software elements that represent instruction execution units 120, an instruction pipeline 121, a register file 122, various instruction execution logic blocks such as MBOX 123 and CBOX 124, internal memory elements such as a data cache (Dcache) 125 and an instruction cache (Icache) 126, a fetch program counter register (fetch PC) 127, and a retire program counter register (retire PC) 128.

Processors such as the Alpha are highly sophisticated and typically use a super scalar out-of-order instruction pipeline 121. For example, in the process of program execution, blocks of program instructions are first fetched from an external memory and placed in the instruction cache 126. Instructions referenced by the fetch PC 127 are then fetched from the instruction cache 126 and forwarded to the instruction pipeline 121. The program logic blocks MBOX 123 and CBOX 124 may then operate on the fetched instructions, controlling access to various other elements such as the register file 122, execution units 120, and data cache 125 in an optimized fashion. As the instruction pipeline 121 is an out of order processor, the instructions are not necessarily completed in the same order in which they are originally fetched. Therefore, a retire PC 128 records the program counter at the time that a particular instruction completes.

The design verification system 10 also includes an external hardware simulation 13. Such a simulation 13 represents the other elements of a complete computer system beyond just the microprocessor chip itself. For example, the external hardware simulation 13 may typically include an external memory cache (Bcache) 130, main memory 131, a bus interface unit 132, a system bus 133, and even other processors 134. The external hardware simulation or XBOX 13 represents the other hardware elements of the complete system being tested. These external elements may be simulated at a high level of abstraction in a general purpose language such as C++.

In order to verify the design of the processor, test programs 14 are devised and applied to both the processor simulation 12 and external hardware simulation 13. As in the prior art, these test programs 14 are generated from a random set of numbers that are then interpreted as instructions by the various elements of the simulation 10.

However, in accordance with the invention, execution of the test programs 14 is monitored and controlled to provide directed external events which are coordinated with internal events. In particular, during a first pass run of a test program, an internal event agent 15 records certain events occurring within the internal processor 12. These events are stored in the profile data structure 17.

Upon a subsequent second execution of the test program 14, the profile data 17 is then used by the external event agent 16 to generate directed external events external to the internal processor simulation, such as events occurring within certain components of the external hardware simulation 13.

Such events may, for example, be generated by the execution of a probe command by external processor 134 which is normally executed by the processor 134 in order to obtain permission to access a particular location in the main memory 131. For example, under normal operation of the processor 12, a given main memory location 131x may need to be accessed at a particular time. While this location 131x is being accessed, given the super scalar pipeline 120 and internal data cache nature of the processor 12, the entire block 131y of locations within which the location 131x resides are typically copied into the Dcache 125. At this time, any other processor such as the external processor 134 wishing to obtain access to the location 131x must first request permission for such access by issuing a probe command. The probe command in this instance will return information indicating that the block 131y presently locked by the processor 12 and is therefore not available for use by the external processor 134.

Other types of external events of interest may also be generated such as interrupts to pass data over the system bus through the bus interface unit 133, for example.

Figure 2:
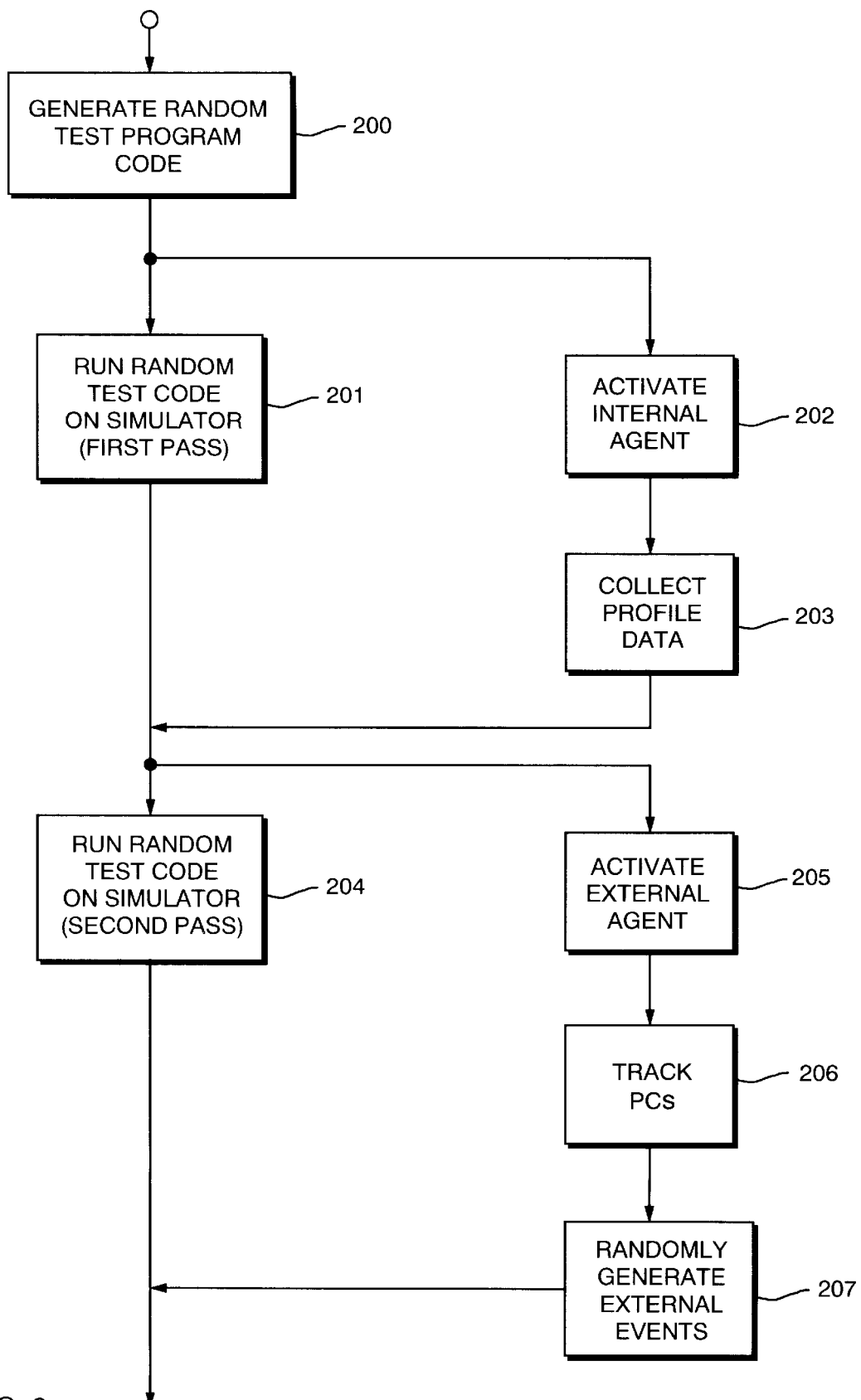
FIG. 2 is a flow diagram showing a series of steps performed by the design verification system.

Turning attention now to FIG. 2, a flow diagram of a sequence of steps performed to verify the design of a microprocessor are shown in greater detail. In general, the process proceeds by generating internal events through a randomly generated test program 14 and by generating external events via the external event agent 16 at random times. However, the type of external events and the point in time at which such events are initiated are of particular concern to the present invention.

As shown in FIG. 2, the process performs a number of steps 200, 201, 202, 203 associated with collecting data about internal events as they occur during a first pass of the test program 14. Thus, in a first step 200, the random test program 14 is generated in a manner which is known in the art. In a next state 201, the test program 14 is run on the processor simulation 12 and external hardware simulation 13 in a first pass. At the same time, the internal agent 15 is activated in step 202 and the internal agent 15 proceeds to collect profile data in step 203 from the results of the step 201 execution of the first pass of the test program 14. Such profile data may preferably include data such as the addresses of the memory locations accessed and the contents of the retire PC 128 for each test instruction. As will be understood shortly, the values of the retire PC 128 are then used as a reference in subsequent steps of the process to generate external events.

After this first pass, the test program 14 is completed, and profile data is stored in the profile data structure 17. An example profile data structure is shown in FIG. 3. The entries include various memory references which detail the address referenced and in some instance, the type of each instruction. The profile data are placed in the list in the order typically in which they occur. An entry 302 is typical of most instructions, where timing reference information such as the retire PC is recorded. In a preferred embodiment, the retire PC for any privileged instructions, such as an Alpha PAL instruction, are not included. Such instructions may include floating point operation overflows, traps, and certain types of interrupts wherein the program order flow is not necessarily the same each time that a program is run. By eliminating such privileged instructions from the list of retired PC's, later steps of the process have greater control over timing synchronization.

Also interspersed in the profile data list are certain other types of entries 304 which are generated when the instruction contains a memory reference, such as a load (LDx) or Store (STx) instruction. These are added to the list, along with the referenced address itself, as the processor completes them (which may occur before the pipeline retires them).

In a second execution pass, including steps 204, 205, 206, and 207, the test program 14 is again initiated using the simulators 12 and 13. During this second pass, the same set of random instructions is applied as during the first step 201. However, during this second run, the external event agent 16 makes use of the profile data structure 17 to generate external events.

Thus, in state 205 the external agent is activated upon initiation of the second run of the test program. In a next state 206, the active external agent tracks the current program counter being executed by the simulation 12.

In state 207, external events are generated at random times using the address data obtained from a window around the current retire PC. This may be implemented as follows. The external agents 16 first read in the list of address data from the profile data structure 17. As the second pass of the simulation 204 proceeds, the external event agent 16 keeps a pointer 310 within the data list to the next PC expected to be retired. While moving the pointer forward in the list, if a data line is seen with a memory reference, the pointer is moved ahead to the next data line containing only a program counter reference.

For example, if the external agent 16 reaches a line such as line 304 in which there is no retire PC information, its pointer is moved forward to line 306. Should the external agent then enter state 207 in which it has decided that an external event (such as a system probe, hardware interrupt, or other event external to the functional test program) should be generated, the external agent picks a data line with a memory reference within a given window of locations containing memory references (e.g., STx or LDx) above or below the present pointer location. Thus, for example, at position 306, if the window size is ten, the external event agent 16 may pick an address in any of the lines ranging from locations 308 through 309.

By doing this, the external event is then generated using an address having some relevance to the internal state of the processor simulation 12. Therefore, more interesting interactions between internal memory instructions and external probing instructions are generated, without the need to create custom programs by hand, but still by generating programs randomly.

As a result of using the present invention, the rate at which interactions between external events and internal events can be greatly increased. This is without the need to devise special purpose test programs. As a result, random test generation procedures are of a higher quality and may be more effectively applied.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for running a functional test program comprising the steps of:
   (a) generating a random functional test program;
   (b) running a first pass of the random functional test program, and recording profile information in response thereto;
   (c) running a second pass of the random functional test program, while generating a directed external event derived from the recorded profile information; and
   (d) during the second pass of the functional test program, maintaining a pointer to a location in the recorded profile information corresponding to a reference program counter location.

2. The method as in claim 1 wherein the profile information includes relative timing reference information.

3. The method as in claim 2 wherein the timing reference information includes retire program counter values.

4. The method as in claim 3 wherein the timing reference information does not include the retire program counter values of privileged instructions.

5. The method as in claim 1 additionally comprising the step of:
   (e) generating the directed external event using information selected from a window of recorded profile information entries located adjacent to the pointer location.

6. The method as in claim 1 wherein the directed external event is an external probe command which includes a reference to a memory location selected from a window of recorded profile information located adjacent to the pointer location.

7. The method as in claim 6 wherein the reference to a memory location is contained in a memory reference instruction stored in the profile information.

8. The method as in claim 1 wherein the profile information includes instruction types and addresses of memory reference instructions.

9. The method as in claim 1 wherein the directed external events are events not defined by the functional test program.

10. The method as in claim 1 wherein the directed external event is an external probe command.

11. The method as in claim 1 additionally comprising the steps of: developing a hardware description language simulation of a processors; and wherein steps (b) and (c) are carried out by running the random functional test program on the hardware description language simulation.

12. A system for running a functional test program, comprising:
    (a) means for generating a random functional test program;
    (b) means for collecting profile information while the random functional test program is being run during a first execution pass, the profile information including at least program counter values; and
    (c) means for generating a directed external event while the random functional test program is being run during a second execution pass; wherein the directed external event is derived from the profile information.

13. The system as in claim 12 wherein the profile information does not include retire program counter values of privileged instructions.

14. The system as in claim 12 wherein the profile information includes instruction types and addresses of memory reference locations.

15. The system as in claim 12 wherein the directed external events are not events defined by the functional test program.

16. The system as in claim 15 wherein the directed external event is an external probe command.

17. The system as in claim 12 additionally comprising:
    (d) a simulator, operating in accordance with a hardware description language description of a processor, the simulator being connected to run the first and second pass of the random functional test program.

18. The system as in claim 12 additionally comprising:
    (d) means for maintaining a pointer to a location in the recorded profile information corresponding to a current program counter location during a second pass of the functional test program.

19. The system as in claim 18 additionally comprising:
    (e) means for generating external event using information selected from a window of recorded profile information entries located adjacent to the pointer location.

20. The system as in claim 18 wherein the directed external event is an external probe command which includes a reference to a memory location selected from a window of recorded profile information located adjacent to the pointer location.

21. The system as in claim 20 wherein the reference to a memory location is contained in a memory reference instruction stored in the profile information.

* * * * *

UNITED STATES PATENT AND TRADEMARK OFFICE
CERTIFICATE OF CORRECTION

PATENT NO. : 6,212,493 B1
DATED : April 3, 2001
INVENTOR(S) : James D. Huggins, David H. Asher, James B. Keller It is certified that error appears in the above-identified patent and that said Letters Patent is hereby corrected as shown below:

Column 7,
Line 47, delete "processors" and insert -- processor --.

Signed and Sealed this

Sixth Day of November, 2001

Attest:

Nicholas P. Godici

NICHOLAS P. GODICI
*Attesting Officer*  *Acting Director of the United States Patent and Trademark Office*